(12) United States Patent
Guyer et al.

(10) Patent No.: US 6,583,989 B1
(45) Date of Patent: Jun. 24, 2003

(54) COMPUTER SYSTEM

(75) Inventors: James Guyer, Northborough, MA (US); Brandon C. Barney, Hudson, MA (US); Ralph C. Frangioso, Jr., Franklin, MA (US); Stephen Daniel, Durham, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/747,376

(22) Filed: Dec. 22, 2000

(51) Int. Cl.[7] .............................. H05K 1/16; H01R 9/05
(52) U.S. Cl. ...................... 361/724; 361/683; 439/581; 312/223.1; 333/123; 333/160
(58) Field of Search ................................ 361/683, 685, 361/686, 724–727, 788, 792, 794, 795, 622–624; 174/28, 102 C, 50, 59, 102 SP, 68.2; 439/74, 65, 69, 578, 581, 67, 607, 608; 312/223.1, 223.2; 333/104, 116, 123, 124, 160, 161; 307/112, 113; 455/347, 349

(56) References Cited

U.S. PATENT DOCUMENTS

| | | | | |
|---|---|---|---|---|
| 5,193,050 A | * | 3/1993 | Dimmick et al. ............ 361/384 |
| 5,388,032 A | * | 2/1995 | Gill et al. ..................... 364/146 |
| 5,724,527 A | * | 3/1998 | Karnik et al. ................ 395/308 |
| 5,896,273 A | * | 4/1999 | Varghese et al. ............ 361/724 |
| 5,913,034 A | * | 6/1999 | Malcolm ............... 395/200.53 |
| 5,971,804 A | * | 10/1999 | Gallagher et al. .......... 361/788 |
| 6,021,047 A | * | 2/2000 | Lopez et al. ................. 361/727 |
| 6,098,131 A | * | 8/2000 | Unger et al. ................. 710/101 |
| 6,175,490 B1 | * | 1/2001 | Papa et al. ................... 361/686 |
| 6,201,690 B1 | * | 3/2001 | Moore et al. ................ 361/683 |
| 6,301,095 B1 | * | 10/2001 | Laughlin et al. ............ 361/624 |
| 6,353,532 B1 | * | 3/2002 | Landrum et al. ........... 361/683 |
| 6,360,333 B1 | * | 3/2002 | Jansen et al. .................. 714/25 |

OTHER PUBLICATIONS

Article "Mass Storage Assembly for Continues On–Line Data Processing Applications", IBM Technical Disclosure Bulletin, May 1989, US, vol. 31, Issue 12, pp. 77–81.*
Industrial catalog by GT, Fundamentech, SUN Microsystem and Crusoe.*

* cited by examiner

Primary Examiner—Darren Schuberg
Assistant Examiner—Lisa Lea-Edmonds
(74) Attorney, Agent, or Firm—Kriegsman & Kriegsman

(57) ABSTRACT

A computer system for managing a computer network comprises a rack cabinet having a cabinet interior. A plurality of infrastructure connector assemblies are fixedly mounted on the rack cabinet in 1-U boundaries, each infrastructure connector assembly including a signal snap interface connector and a power snap interface connector. A plurality of compute elements are adapted to be slidably disposed within the cabinet interior of the rack cabinet in a stacked relationship, each compute element including at least one infrastructure connector assembly which releasably snap-interconnects with an associated infrastructure connector assembly mounted on the rack cabinet. A distributed power bay is disposed within the rack cabinet and provides central power for the computer system. A rack manager is disposed within the rack cabinet and includes the central video and I/O devices for the computer system. A cabinet controller is disposed within the rack cabinet and is responsible for the management of a geography bus and an intelligent chassis management bus for the computer system.

13 Claims, 13 Drawing Sheets

COMPUTER SYSTEM

BACKGROUND OF THE INVENTION

The present invention relates generally to computer systems and more particularly to computer systems which include a plurality of compute elements which are slidably disposed within a rack cabinet.

Computers, or compute elements, are typically connected to a communication network, such as the internet, so as to enable information (i.e., data or files) to be passed from one computer to another computer. When large amounts of information are shared by multiple computers, a network server (also referred to in the art simply as "a server") is connected to the communication network to provide information to numerous network clients (also referred to in the art simply as "clients").

A network server enables many individual clients to access information that is stored within the single server. For example, servers are commonly used to host web sites which can be accessed by many individual computers through the internet.

The establishment of a client-server computer network creates numerous advantages. For example, a client-server relationship enables multiple clients to concurrently access information stored on one or more servers. In addition, a client-server relationship enables information to be added or modified to the one or more servers rather than to each of the individual clients, thereby reducing the overall cost to maintain the system.

Pluralities of individual servers are often disposed within a rack cabinet in a stacked relationship to create a computer system, such a computer system being commonly referred to as a rack system in the art. Rack cabinets are generally rectangular in shape and are constructed to enable individual compute elements, such as computer servers or disc array subsystems, to be slidably disposed therewithin. For greater computing capabilities, multiple rack systems are often connected together by a network, such as a local area network (LAN).

Rack cabinets are typically constructed to house components which comply with industry NEMA standards. Specifically, rack cabinets are typically constructed to house components which have a width which complies with industry NEMA standards (i.e., 19 inches) and which have a height which complies with industry NEMA standards (i.e., a multiple of rack units or "U" where 1-U equals 1.75 inches).

An individual server which is constructed to be disposed within a rack cabinet typically includes a rectangular chassis, or housing, constructed of a hard and durable material. One or more brackets are commonly mounted on the exterior of the chassis and are adapted to engage associated brackets mounted on the rack cabinet, thereby enabling the individual server to be slidably disposed within the rack cabinet. It should be noted that, due to the relatively heavy weight of conventional servers, ball bearing brackets are typically used to slidably dispose individual servers within a rack cabinet. As can be appreciated, ball bearing brackets are typically heavy and costly to a manufacture and, accordingly, are not desirable for use in slidably disposing individual servers within a rack cabinet.

An individual server which is constructed to be disposed within a rack cabinet also typically includes, inter alia, a plurality of removable power supplies disposed in either the front or the rear of the chassis, a plurality of removable hard drives disposed in the front control panel of the chassis, a 3.5 inch diskette drive disposed in the front control panel of the chassis and/or a CD-ROM disposed in the front control panel of the chassis.

It should be noted that the implementation of the aforementioned internal devices into each server in the computer system introduces numerous disadvantages.

For example, as a first disadvantage, the weight of each server is significantly increased by disposing all of the aforementioned internal devices into its associated chassis. As a consequence, it has been found that the considerable weight of traditional servers renders them difficult to handle. In fact, multiple technicians are often needed to service and/or replace a single computer server.

As a second disadvantage, the total cost of the computer system is considerably increased by disposing all of the aforementioned internal devices into each server located within the rack cabinet. As can be appreciated, redundantly disposing the same internal devices into each computer server in the computer system creates a undesirable amount of waste.

As a third disadvantage, the density of the computer system is considerably reduced by disposing all of the aforementioned internal devices into each server located within the rack cabinet. Specifically, because a large portion of the chassis of each server requires designation for the aforementioned internal devices, there remains less free space in the chassis which can be designated for processors and associated circuitry. As a consequence, traditional 2-U servers typically comprise, at most, a pair of microprocessors.

An individual server which is constructed to be disposed within a rack cabinet also typically includes various fundamental connectors mounted on the rear panel of the chassis for interconnecting the server to other devices. Specifically, a server typically includes one or more power connectors which connect the server to a power source. Each server also typically includes one or more system management connectors which interconnect the various components housed within the one or more rack cabinets which constitute the computer system. Each server further typically includes one or more network connectors which connect the server to a network, such as a local area network (LAN) or the internet. Each server additionally typically includes one or more storage connectors which connect the server to at least one storage device. Each server also typically includes one or more input/output (I/O) connectors which connect the server to I/O devices, such as a keyboard, mouse and monitor.

In use, the fundamental connectors for each server are connected to external devices using conventional wiring or cables. Specifically; the one or more power connectors for the server are typically connected to the power source using a standard power cord, or cable. The one or more system management connectors for the server are typically connected to the other components which constitute the computer system using standard LAN cables. The one or more network connectors are typically connected to the designated network using standard LAN cables. The one or more storage connectors are typically connected to one or more storage devices using fibre channel cables or small computer systems interface (SCSI). The one or more I/O connectors are typically connected to associated I/O devices using standard I/O cables. As can be appreciated, connecting each server of.the computer system to the various aforementioned external devices necessitates a considerable number of external wiring interconnections which, in turn, introduces numerous disadvantages.

Specifically, as a first disadvantage, the considerable number of external wiring interconnections which are required between each computer server and the various aforementioned external devices can create a significant level of confusion for technicians who are installing, servicing and/or replacing individual servers in the computer system. In fact, it has been found that technicians who are required to disconnect an individual server from the computer system often mistakingly disconnect the wrong server, which is highly undesirable.

As a second disadvantage, the external wiring interconnections which need to be made between each computer server and the various aforementioned external devices requires that a technician servicing the computer system walk behind the computer system to access the various connectors. As a result, an adequately sized path is required behind the computer system, thereby increasing the total size of the immediate area required to house such a system. Increasing the total size of the immediate area required to house such a system, in turn, increases operation costs, which is highly undesirable.

As a third disadvantage, the considerable number of external wiring interconnections which are required between each computer server and the various aforementioned external devices renders the installation, servicing, upgrading and/or replacement of individual servers considerably time consuming and labor intensive, which is highly undesirable.

SUMMARY OF THE INVENTION

It is an object of the present invention to provide a new and improved computer system.

It is also an object of the present invention to provide a computer system which comprises a plurality of compute elements which can be slidably disposed within a rack console.

It is yet another object of the present invention to provide a computer system as described above wherein each of the compute elements can be easily connected to external devices.

It is still another object of the present invention to provide a computer system as described above which is easily accessible.

It is another object of the present invention to provide a computer system as described above wherein each of the plurality of compute elements is light in weight.

It is yet another object of the present invention to provide a computer system as described above wherein each of the plurality of compute elements is inexpensive to manufacture, has a limited number of parts and is easy to install within the rack console.

It is still another object of the present invention to provide a computer system as described above wherein each of the plurality of compute elements has a high processing density.

It is another object of the present invention to provide a computer system as described above wherein each of the plurality of compute elements share a common set of peripheral devices, such as hard drives, a diskette drive and a CD-ROM drive.

Accordingly, as one feature of the present invention, there is provided a computer system comprising a rack cabinet having a cabinet interior, a first infrastructure connector assembly fixedly mounted on said rack cabinet, and a compute element adapted to be slidably disposed within the cabinet interior of said rack cabinet, said-compute element comprising a first infrastructure connector assembly which is adapted to releasably engage said first infrastructure connector assembly fixedly mounted on said rack cabinet.

As another feature of the present invention, there is provided a computer system comprising a rack cabinet having a cabinet interior, at least one compute element adapted to be disposed within the cabinet interior of said rack cabinet, and at least one distributed power bay adapted to be disposed within the cabinet interior of said rack cabinet for providing central power for said computer system.

Various other features and advantages will appear from the description to follow. In the description, reference is made to the accompanying drawings which form a part thereof, and in which is shown by way of illustration, a specific embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

A fuller understanding of the nature and objects of the present invention will become apparent upon consideration of the following detailed description taken in connection with the accompanying drawings, wherein like reference numerals represent like parts.

DETAILED DESCRIPTION OF THE PREFERRED EMBODIMENT

Figure 1:
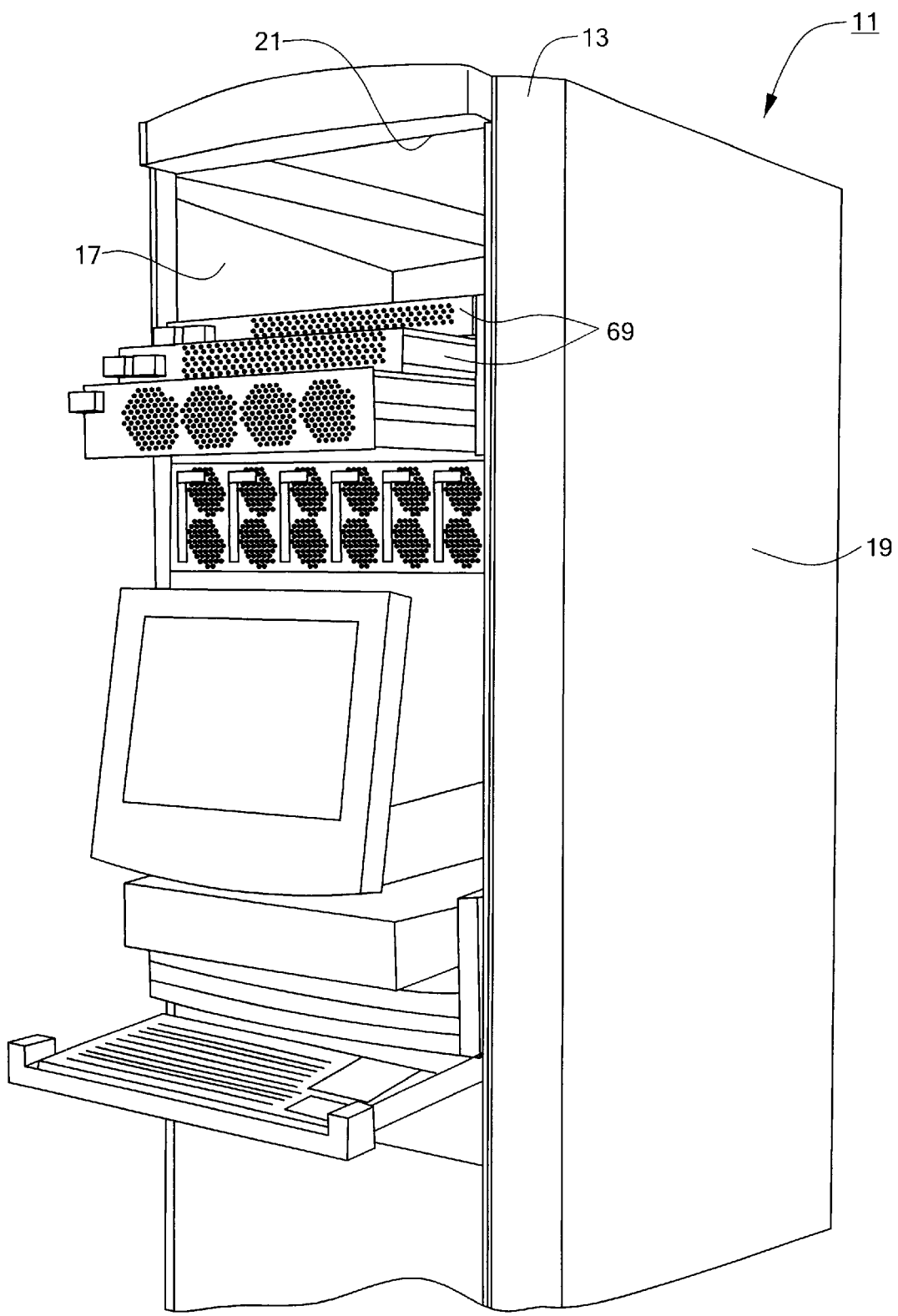
FIG. 1 is a front perspective view of a computer system constructed according to the teachings of the present invention.

Referring now to FIG. 1, there is shown a computer system for managing a computer network constructed according to the teachings of the present invention, the computer system being identified generally by reference numeral 11.

Computer system 11, which may also be referred to herein as a rack system, comprises a rack cabinet 13, which may also be referred to herein simply as a rack. Rack cabinet 13 is preferably in the form of a rectangular cabinet which includes a frame (or skeleton) 15, a left side panel 17 mounted on frame 15, a right side panel 19 mounted on frame 15, and a top panel 21 mounted on frame 15. Together, left side panel 17, right side panel 19 and top panel 23 define a cabinet interior 25 therebetween.

Cabinet interior 25 is sized and shaped so as to enable a plurality of individual components to be disposed therewithin in a stacked relationship. In addition, it should be noted that cabinet interior 25 includes a compute element portion 27 which is adapted to slidably receive one or more compute elements 29, which will be described further in detail below.

It is preferred that rack cabinet 13 be constructed to meet NEMA industry size and dimension standards. For example, rack cabinet 13 is preferably a standard 38-U (approximately 73 inches in height), model 15000 Quadrack, which is capable of holding up to 38-U of individual components therein. However, it is to be understood that rack cabinet 13 could be constructed in any size or dimension without departing from the spirit of the present invention.

A plurality of brackets 31-1 are mounted on frame 15 along the interior surface of left side panel 17 and a plurality of brackets 31-2 are mounted on frame 15 along the interior surface of right side panel 19. It should be noted that a pair of brackets 31 are mounted on frame 15 within compute element portion 27 of cabinet interior 25 in 1-U boundaries (1-U equaling 1.75 inches). Specifically, one bracket 31-1 is mounted on frame 15 along the interior surface of left side panel 17 and one bracket 31-2 is mounted on frame 15 along the interior surface of right side panel 17 for each 1-U of compute element portion 27 of cabinet interior 25. As can be appreciated, because pairs of brackets 31 are mounted on frame 15 within compute element portion 27 in 1-U boundaries, various sized compute elements 29 are capable of being slidably disposed within any unused, or free, portion of compute element portion 27, as will be described further in detail below. Accordingly, rack cabinet 13 is adequately adapted to support future advancements in the components disposed therein.

A plurality of infrastructure connector assemblies 33 are fixedly mounted on the rear portion of frame 15. Specifically, each infrastructure connector assembly 33 is mounted on an associated L-shaped bracket (not shown) which, in turn, is mounted onto the rear of frame 15 such that infrastructure connector assembly 33 is disposed between left side panel 17 and right side panel 19. It should be noted that one infrastructure connector assembly 33 is mounted on frame 15 for each 1-U boundary of compute element portion 27 of cabinet interior 25. As can be appreciated, because one infrastructure connector assembly 33 is mounted on frame 15 for each 1-U boundary of compute element portion 27, various sized compute elements 29 are capable of being slidably disposed within any unused, or free, portion of compute element portion 27 and connected to rack cabinet 13, as will be described further in detail below.

Each infrastructure connector assembly 33 is adapted to electrically and mechanically interconnect with an associated connector assembly which is fixedly mounted on an individual compute element 29 that is disposed within compute element portion 27 of rack cabinet 13. Specifically, each infrastructure connector assembly 33 is adapted to quickly, snap-connect with an associated connector assembly which is fixedly mounted on an individual compute element 29 disposed into rack cabinet 13, as will be described further in detail below. Furthermore, each infrastructure connector assembly 33 is connected, such as by cables, to various system busses and devices in order to properly interconnect the components housed within computer system 11, as will be described further in detail below.

Each infrastructure connector assembly 33 comprises a signal snap interface connector 35 and a power snap interface connector 37.

Figure 5:
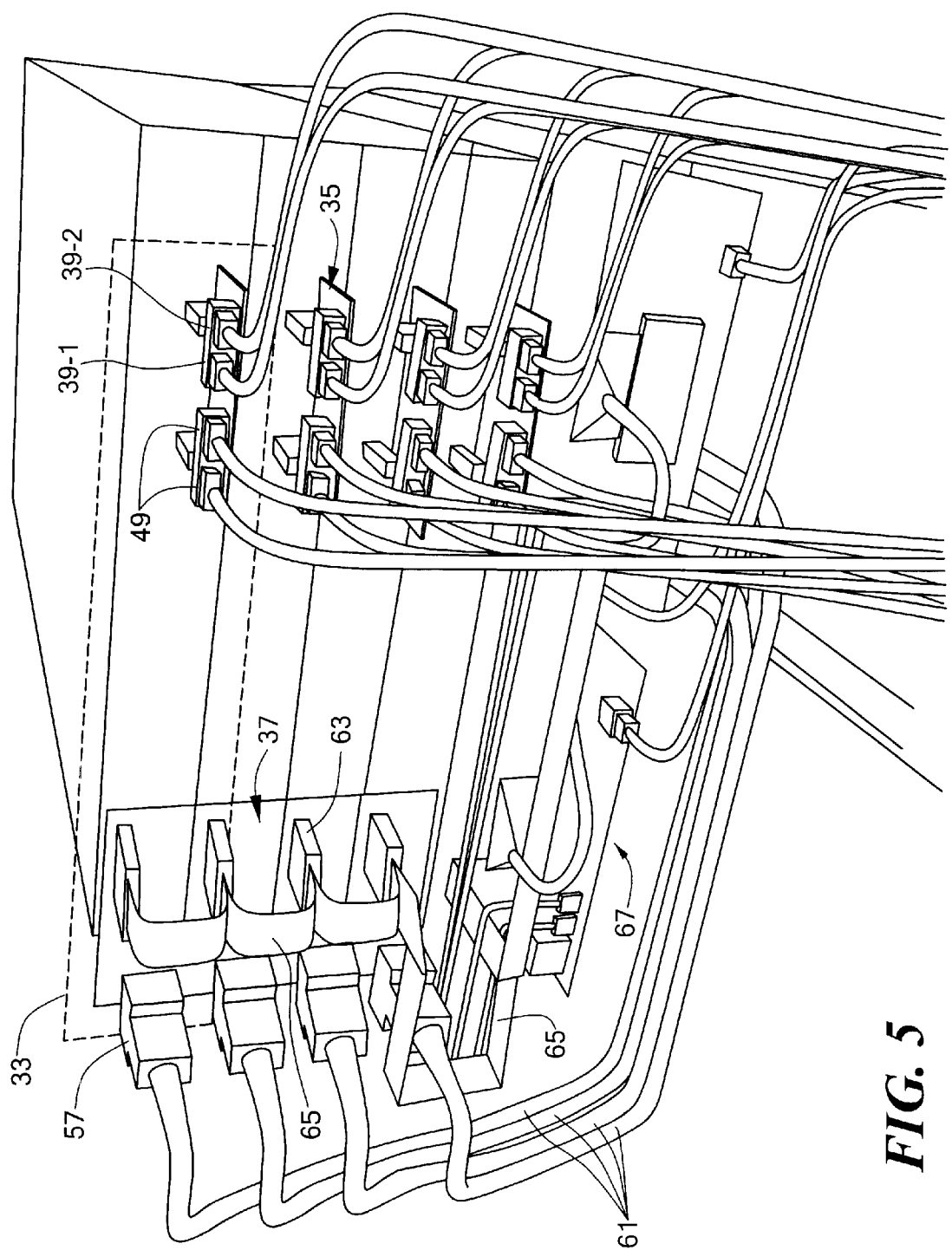
FIG. 5 is an enlarged rear perspective view of the computer system shown in FIG. 4.
Figure 6:
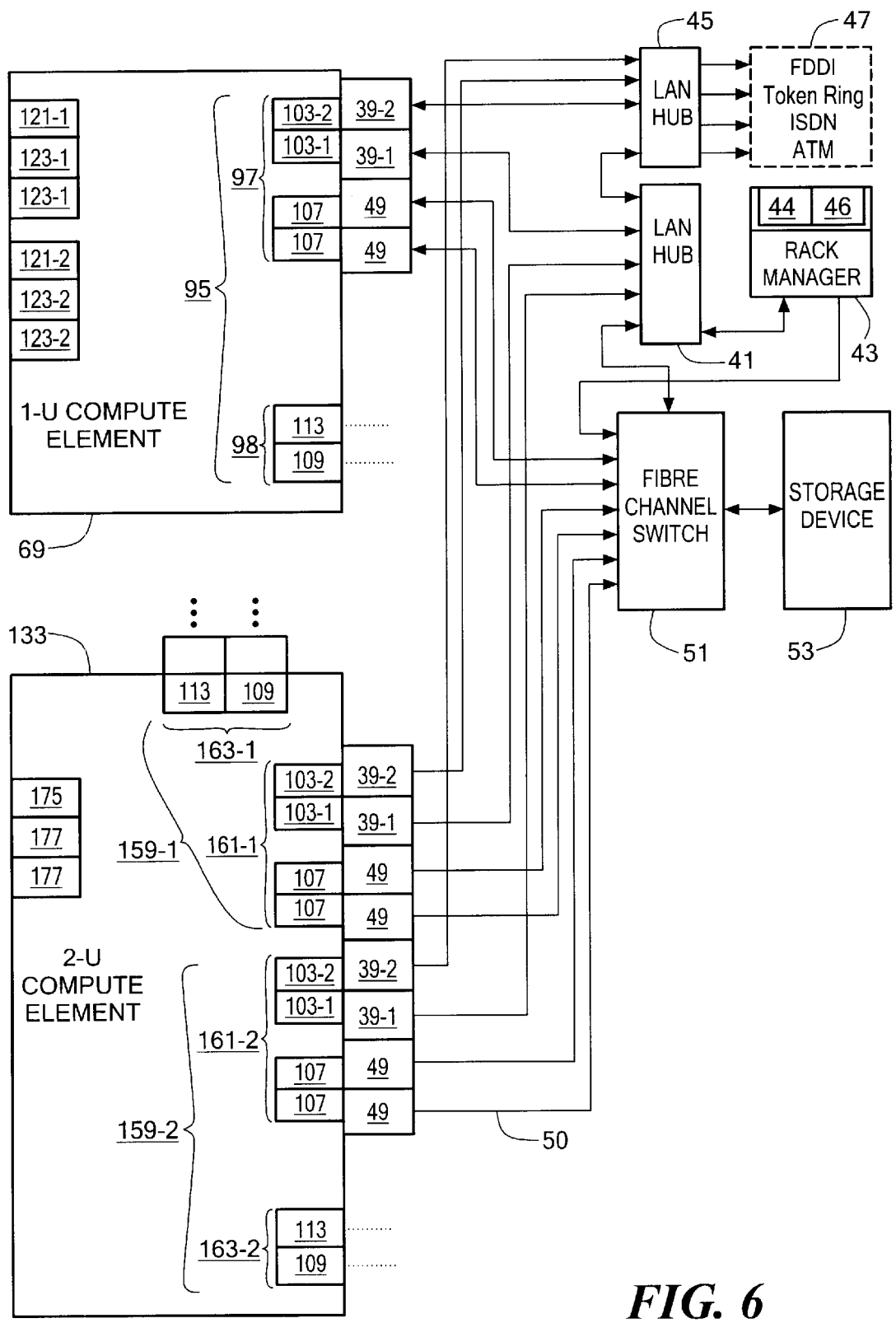
FIG. 6 is a block diagram showing the signal snap interface connections for two of the computer elements shown in FIG. 1.
Figure 10:
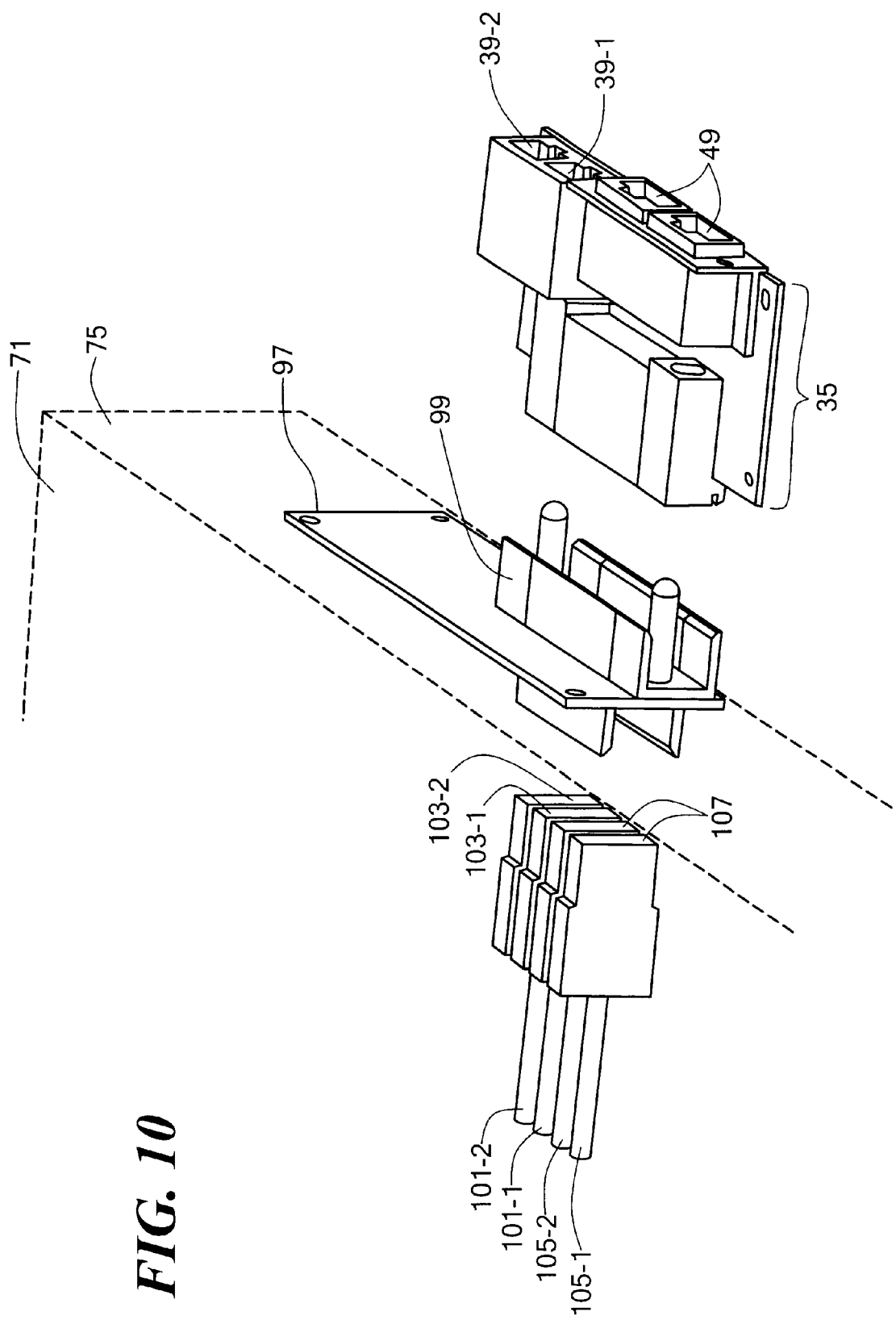
FIG. 10 is an exploded, rear perspective view of one of the 1-U compute elements shown in FIG. 1, the compute element being shown in alignment with a corresponding signal snap interface connector on the rack cabinet, the chassis of the compute element being shown in fragmentary, dashed form.

Referring now to FIGS. 5, 6 and 10, each signal snap interface connector 35 is in the form of a right angle, female receptacle which includes a pair of 10/100 ethernet local area network (LAN) connectors 39. One LAN connector 39-1 is permanently connected, such as by a LAN cable, to a first 10/100 ethernet LAN hub 41 which, in turn, is permanently connected to a rack manager 43 (which will be described in further detail below) for computer system 11. The other LAN port 39-2 is connected, such as by a LAN cable, to a second 10/100 ethernet LAN hub 45, or switch, which, in turn, is connected to an enterprise local area network (LAN) 47 within a data center (i.e., ATM, FDDI, Token Ring or ISDN) and to first 10/100 ethernet LAN hub 41.

Each signal snap interface connector 35 also includes a pair of fibre channel, or storage, connectors 49. Both fibre channel connectors 49 are connected, such as via a 2 Gbit fibre channel, to a fibre channel storage area network (SAN), or switch, 51 which, in turn, is connected to a storage device/array 53 (which will described in further detail below), to rack manager 43, and to first 10/100 ethernet LAN hub 41.

Figure 7:
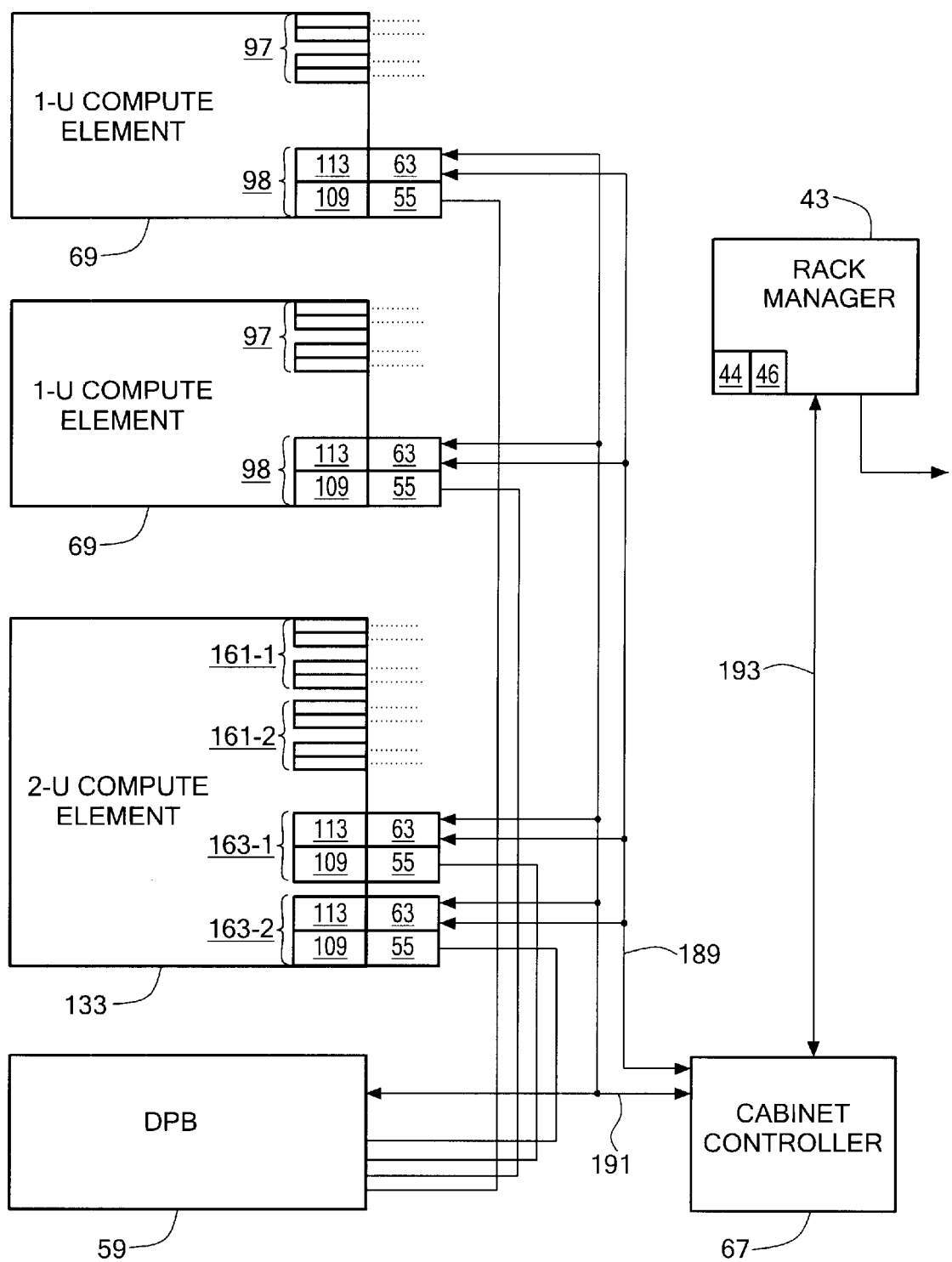
FIG. 7 is a block diagram showing the power snap interface connections for the computer system shown in FIG. 1.
Figure 8:
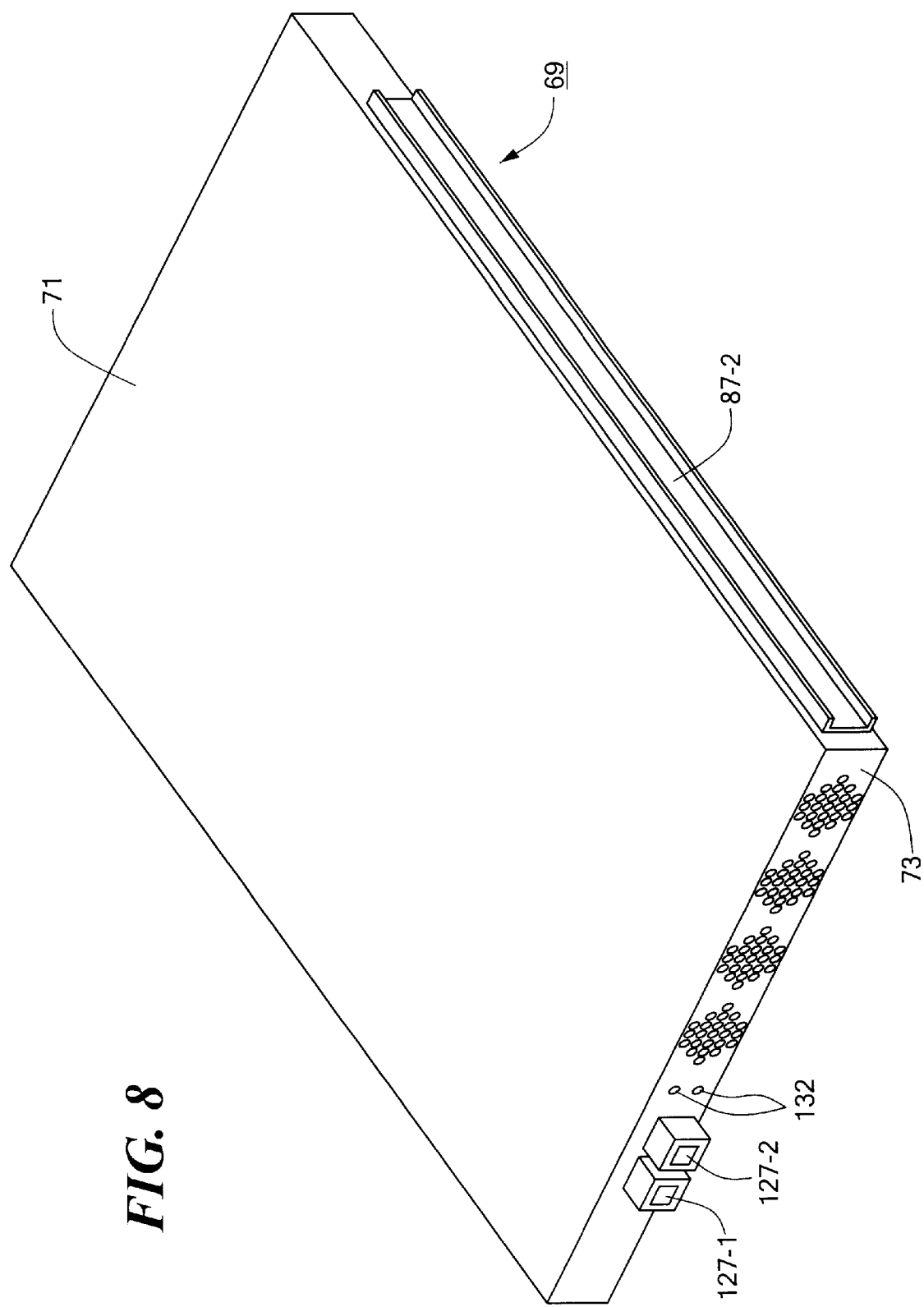
FIG. 8 is a front perspective view of one of the 1-U compute elements shown in FIG. 1.
Figure 11:
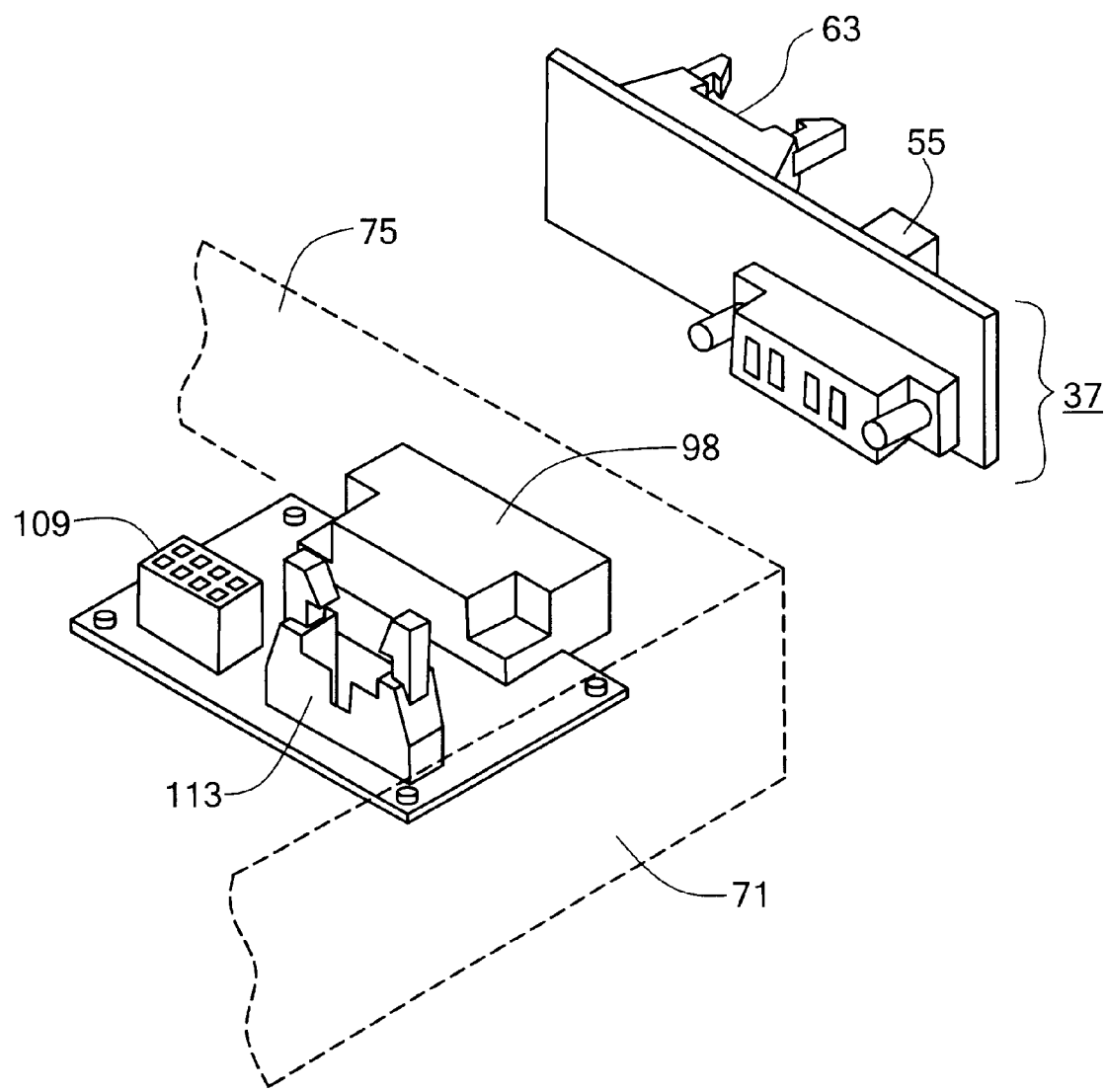
FIG. 11 is an exploded, front perspective view of one of the 1-U compute elements shown in FIG. 1, the compute element being shown in alignment with a corresponding power snap interface connector on the rack cabinet, the chassis of the compute element being shown in fragmentary, dashed form.

Referring now to FIGS. 5, 7 and 11, each power snap interface connector 37 is in the form of a vertically disposed power board which includes an eight pin receptacle, power connector 55. Power connector 55 is adapted to be connected to an eight prong power plug 57 which, in turn, is connected to a distributed power bay 59 via a 48 volt power cord 61, as will be described further in detail below.

Each power snap interface connector 37 also includes a combination geography bus and intelligent chassis management bus (ICMB) connector 63. Each geography bus and ICMB connector 63 is connected, via a ribbon cable 65, to a cabinet controller 67 (which will be described in further detail below) and to distributed power bay 59.

As can be appreciated, the placement of quick-connect, infrastructure connector assemblies 33 in compute element portion 27 of rack cabinet 13 which, in turn, can be easily connected to and disconnected from an associated infrastructure connector assembly that is fixedly mounted on an individual compute element 29 disposed within rack cabinet 13 provides numerous advantages.

Specifically, as a first advantage, the utilization of infrastructure connector assemblies 33, which are permanently mounted on frame 15 in 1-U boundaries, greatly improves the flexibility in which the consumer can configure individual compute elements 29 within rack cabinet 13. In fact, for computer system 11, the consumer is free to dispose various sized compute elements 29 within rack 13, the total size of the various compute elements adding up to no more than 32-U in height. As a result, computer system 11 can be easily modified to meet the individual needs of the consumer, thereby increasing the general purpose usage model.

As a second advantage, the utilization of quick-connect, or quick-snappable, infrastructure connector assemblies 33, which can be easily connected to and disconnected from associated infrastructure connector assemblies on the individual compute elements 29 disposed within rack cabinet 13, enables compute elements 29 to be easily serviced and/or replaced. Specifically, the quick-connect interconnection enables the individual compute elements 29 to be connected to or disconnected from rack cabinet 13 by a single person in less than one minute of service time.

As a third advantage, the utilization of connector assemblies 33 which are permanently mounted onto the infrastructure of rack cabinet 13 simplifies the interconnection of the individual compute elements 29 to the remainder of computer system 11. Specifically, the utilization of quick-connect, or quick-snappable, infrastructure connector assemblies 33, which can be easily connected to and disconnected from associated infrastructure connector assemblies on the individual compute elements 29 disposed within rack cabinet 13, eliminates all exterior wiring for the individual compute elements 29. As a result, access to the various individual compute elements 29 for servicing and/or replacement requires no connection or disconnection of wiring but rather limits all the required electrical connection/disconnection to the snap-connection between rack cabinet 13 and the individual compute elements 29. Because no external cables need to be connected or disconnected during the servicing, installation and/or replacement of individual compute elements 29 from rack cabinet 13, the potential for cable connection errors is eliminated, which is highly desirable.

As a fourth advantage, the utilization of quick-connect, or quick-snappable, infrastructure connector assemblies 33, which can be easily connected to and disconnected from associated infrastructure connector assemblies on the individual compute elements 29 disposed within rack cabinet 13, reduces the maximum size of the space needed for computer system 11. Specifically, the quick-snap interconnect infrastructure between rack cabinet 13 and the individual compute elements 29 enables all the individual compute elements 29 housed within rack cabinet 13 to be accessed entirely through the front of rack cabinet 13. As a result, because the individual compute elements 29 can be accessed for servicing and/or replacement through the front of rack cabinet 13, there user is no longer required to walk behind computer system 11 for servicing, thereby decreasing the overall size of the space required for computer system 11.

As noted above, various sized compute elements 29 are capable of being slidably disposed within and interconnected to rack cabinet 13.

Figure 2:
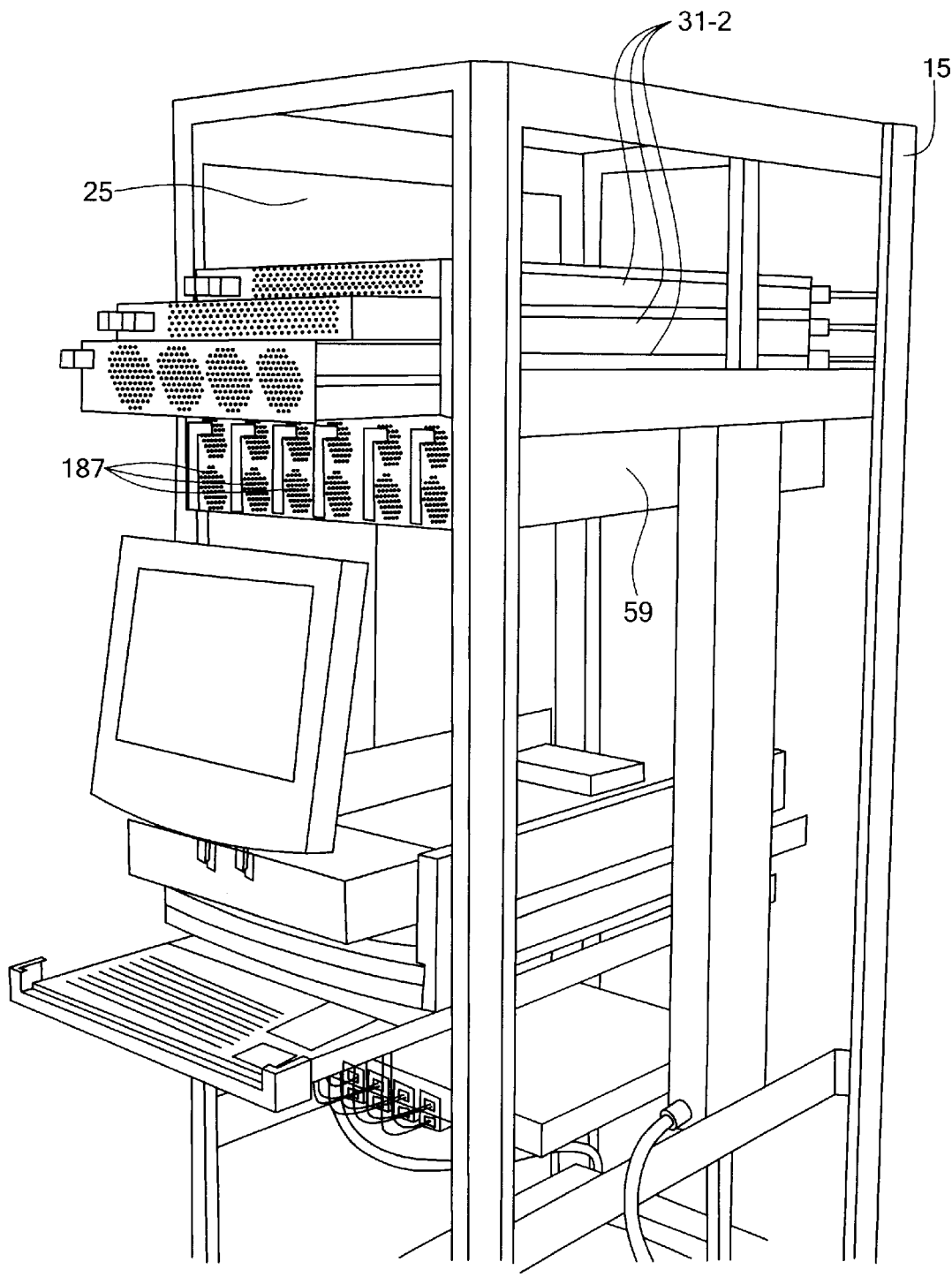
FIG. 2 is a front perspective view of the computer system shown in FIG. 1, the computer system being shown without the left and right side panels of the rack cabinet.
Figure 3:
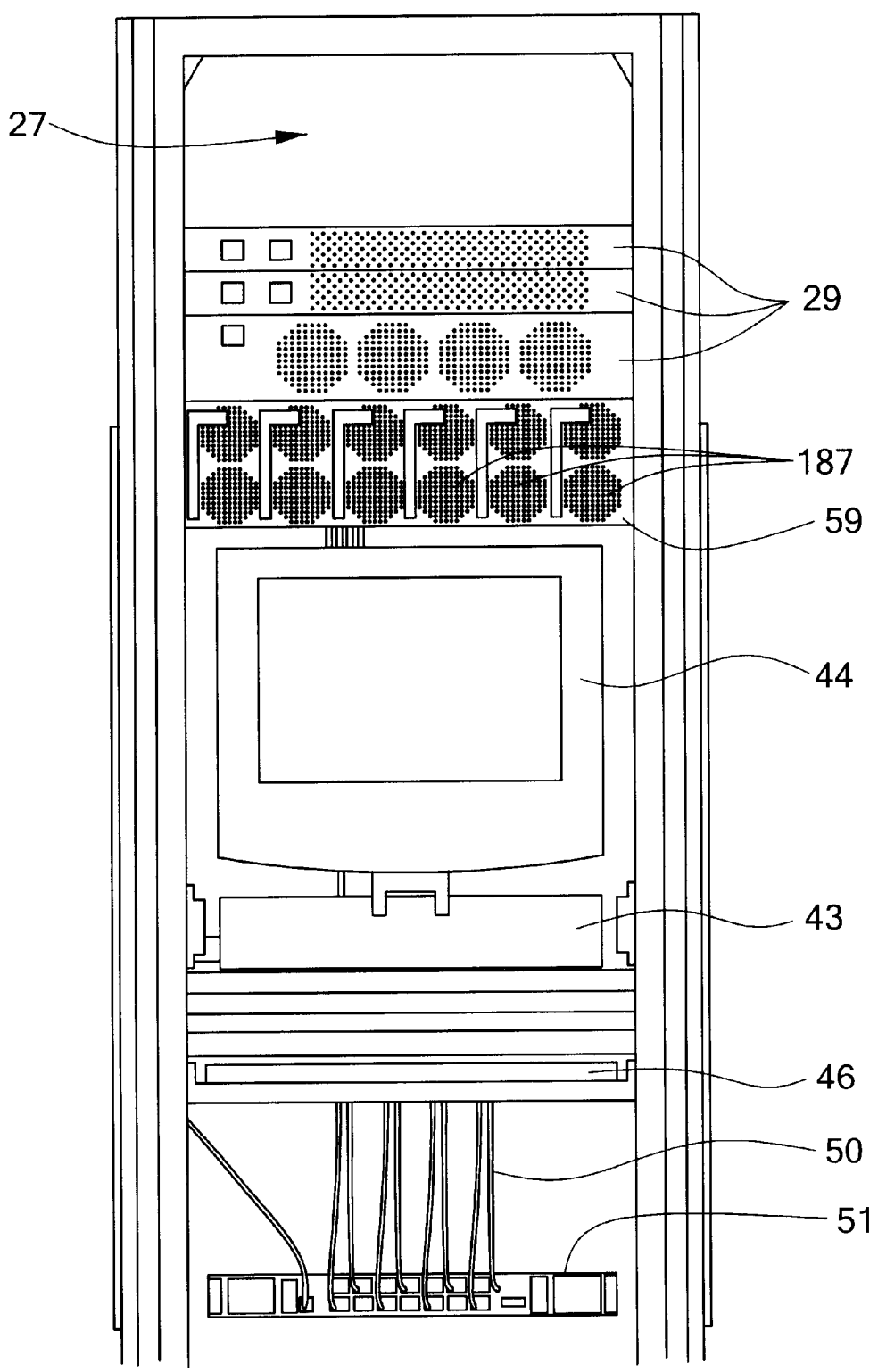
FIG. 3 is a front plan view of the computer system shown in FIG. 2.
Figure 4:
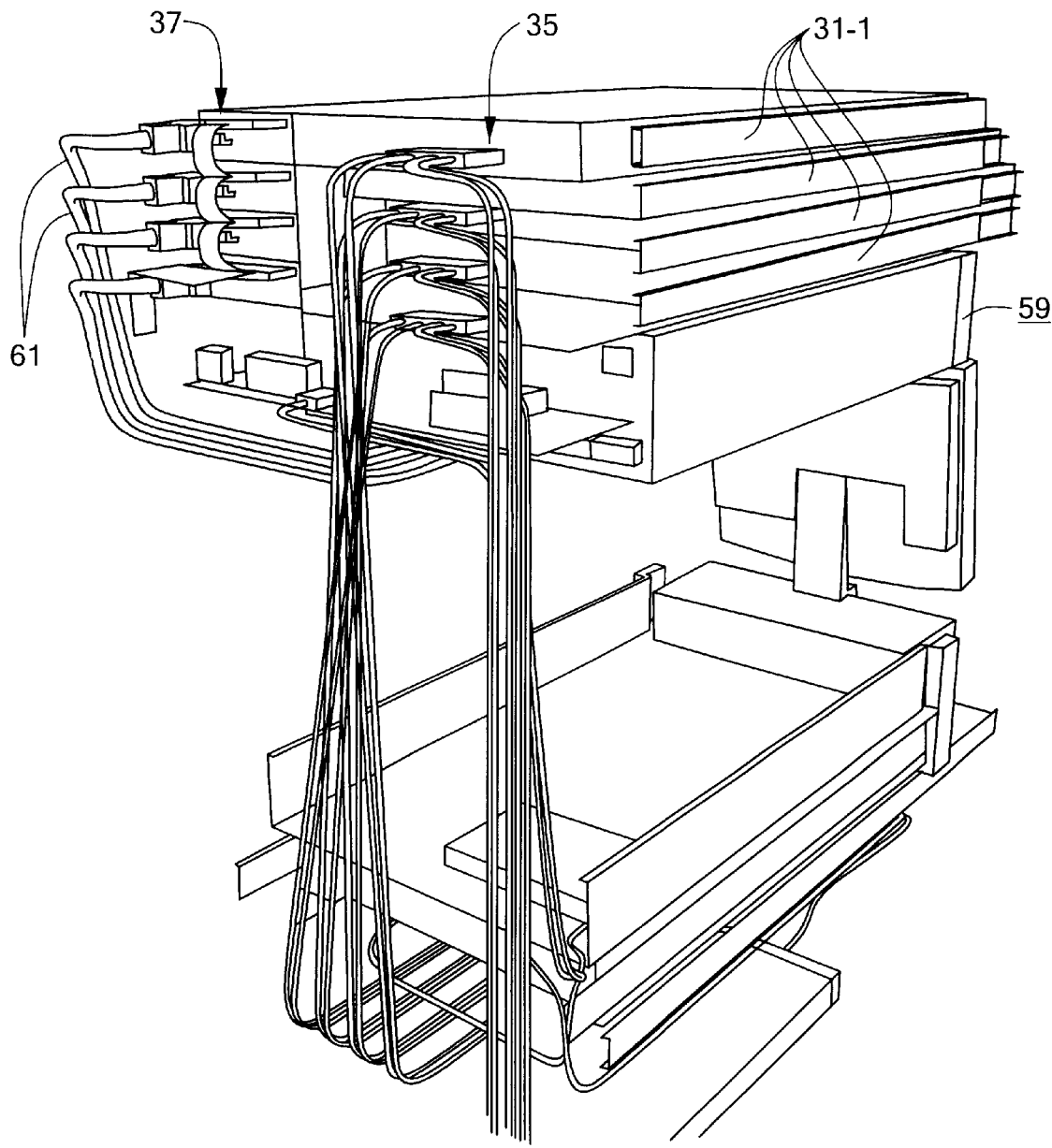
FIG. 4 is a rear perspective view of the computer system shown in FIG. 1, the computer system being shown without the rack cabinet.

One type of compute element 29 which is adapted to be disposed within and interconnected to rack cabinet 13 is a 1-U compute element 69, a pair of 1-U compute elements 69 being shown in computer system 11 in FIGS. 1–3. As will be described further in detail below, the particular construction of 1-U compute element 69 provides numerous advantages.

Specifically, as a first advantage, 1-U compute element 69 does not include any internal devices, such as hard drives, power supplies, or CD-ROMs. As a result, compute element 69 has an increased processor density and a lighter overall weight, thereby improving performance and handling. It should be noted that hard drives are not required because the 1-U compute element 69 fiber boots from direct connect, or SAN connected, RAID storage device 53 (which will be described further in detail below). The CD-ROM, DVD and/or diskette drives are provided remotely through centrally located rack manager 43 (which will be described further in detail below).

As a second advantage, 1-U compute element 69 functions essentially as two independent, dual processor, servers which are co-housed within a single 1-U chassis. It should be noted that, for reference purposes only, each of the two independent servers which share the same 1-U chassis will be referred to herein as sub-servers 70 of common 1-U compute element 69. As can be appreciated, the increased processor density of 1-U compute element 69 enables four processors to be utilized within a single 1-U chassis (rather than just one or two as in traditional prior art servers), which is highly desirable.

Referring now to FIGS. 8–11, 1-U compute element 69, which is adapted to be hot-snapped into rack cabinet 13, comprises a generally rectangular 1-U chassis, or housing, 71 having a front panel 73, a rear panel 75, a top panel 77, a bottom panel 79, a left side panel 81 and a right side panel 83 which together define an interior cavity 85 therebetween, front panel 73 serving as the user interface control panel for compute element 69.

A pair of brackets 87 are fixedly mounted onto chassis 71 to enable compute element 69 to be slidably disposed within rack cabinet 13. Specifically, a first bracket 87-1 is fixedly mounted onto left side panel 81 and a second bracket 87-2 is fixedly mounted on right side panel 83. Pair of brackets 87 are sized and shaped to slidably engage within an associated pair of brackets 31 which are mounted on frame 15 of rack cabinet 13. It should be noted that, since brackets 31 are mounted on frame 15 within compute element portion 27 of cabinet interior 25 in 1-U boundaries, 1-U compute element 69 can be slidably disposed within any unused, 1-U portion of compute element portion 27 of rack cabinet 13, according to the needs of the user. It should also be noted that neither brackets 31 nor brackets 87 are equipped with ball bearings due to the light, highly serviceable nature of compute element 69, which is highly desirable.

First and second main printed circuit boards, or motherboards, 89-1 and 89-2 are disposed within interior cavity 85 of chassis 71 in side-by-side relation, printed circuit boards 89 being mounted on bottom panel 79. Preferably, each motherboard 89 has a maximum size of 12 inches by 13 inches. It should be noted that first and second main printed circuit boards 89 function independent of one another, each printed circuit board 89 serving as the associated motherboard for each sub-server 70 of 1-U compute element 69. As such, the implementation of independently functioning motherboards 89 essentially creates first and second, independent, sub-servers 70-1 and 70-2, respectively, which are co-housed within single 1-U chassis 71. As can be appreciated, enabling two independent sub-servers 70 to fit within single 1-U chassis 71 greatly increases the processor density of compute element 69 as compared to conventional prior art servers, which is highly desirable.

A first pair microprocessors 91-1 are mounted on first motherboard 89-1 and a second pair of microprocessors 91-2 are mounted on second motherboard 89-2, the four processors 91 being responsible for the main computing functions of each sub-server 70 of 1-U compute element 69. An associated multi-finned heatsink (not shown) is preferably mounted on each of the four processors 91, each heatsink serving to facilitate the cooling of its associated processor 91. For example, each processor 91 may be a 1 Ghz COPPERMINE (CuMi) processor of the type manufactured by INTEL CORPORATION. However, it is to be understood that alternative processors could be used in place thereof, such as PENTIUM processors of the type manufactured by INTEL CORPORATION, without departing from the spirit of the present invention.

As noted above, the implementation of four, high speed, processors 91 within single 1-U chassis 71 provides compute element 69 with at least two times more processor density than conventional, similar sized servers, which is highly advantageous. Specifically, a quad processor 1-U server is highly desirable in that the increase in the number of processors per compute element enables the compute element to handle more requests per second and improves performance for application serving. In addition, it should also be noted that 1-U compute element 69 can be alternatively configured to operate as a single server which, due to its increased density, thermal capability and power capability, is capable of comprising four microprocessors (rather than one or two as in typical prior art servers) within a single 1-U chassis.

A single infrastructure connector assembly 95 is permanently mounted on rear panel 75 of chassis 71. As can be appreciated, as compute element 69 is slidably disposed within compute element portion 27 of rack cabinet 13, infrastructure connector assembly 95 is adapted to snap-interconnect with a corresponding infrastructure connector assembly 33 mounted on the rear portion of frame 15 of rack cabinet 13, thereby electrically and mechanically coupling compute element 69 with rack cabinet 13.

Infrastructure connector assembly 95 comprises a signal snap interface connector 97 and a power snap interface connector 98.

Referring now to FIGS. 6 and 10, signal snap interface connector 97 includes a male, vertical header 99 which is adapted to snap-interconnect within the signal snap interface connector 35 of the corresponding infrastructure connector assembly 33 in rack cabinet 13.

Signal snap interface connector 97 also includes a pair of 10/100 ethernet, unshielded, local area network (LAN) cables 101, one LAN cable 101-1 being connected to motherboard 89-1 for sub-server 70-1 and the other LAN cable 101-2 I being connected to motherboard 89-2 for sub-server 70-2 of compute element 69. Each LAN cable 101 includes an associated LAN connector 103 which is disposed into vertical header 99, one LAN connector 103-1 being connected to LAN connector 39-1 and the other LAN connector 103-2 being connected to LAN connector 39-2.

Signal snap interface connector 97 further includes a pair of shielded fibre cables 105, one fibre channel cable 105-1 being connected to motherboard 89-1 for sub-server 70-1 and the other fibre channel cable 105-2 being connected to motherboard 89-2 for sub-server 70-2. Each fibre channel cable 105 includes an associated fibre channel connector 107 which is disposed into vertical header 99, each fibre channel connector 105 being connected to an associated fibre channel connector 49.

Referring now to FIGS. 7 and 11, a power snap interface connector, or direct current interface assembly (DCIA), 98 which is permanently mounted on rear panel 75 of chassis 71. It should be noted that power snap interface connector 98 is adapted to snap-interconnect with power snap interface 37 of the corresponding infrastructure connector assembly 33 in rack cabinet 13.

Power snap interface 98 is connected to a power connector 109 which, in turn, is electrically connected to power connector 55 of the corresponding infrastructure connector assembly 33 on rack cabinet 13 when 1-U compute element 69 is disposed within rack cabinet 13. In use, power connector 109 serves to provide 48 Volts of DC power to 1-U compute element 69. In particular, power connector 109 includes 48 Volts of DC power and 12 Volts of standby power. It should be noted that power connector 109 provides enough power to create dual power domains, one for each sub-server 70 of compute element 69, thereby rendering each sub-server 70 independently power controlled. Specifically, power connector 109 is connected to a long dual power domain DC to DC power conversion board 111 which is disposed in interior cavity 85 of chassis 71 on bottom panel 79.

Power snap interface 98 is also connected to a combination geography bus and intelligent chassis management bus (ICMB) connector 113 which, in turn, is connected to the geography bus and ICMB connector 63 of the corresponding infrastructure connector assembly 33 on rack cabinet 13 when 1-U compute element 69 is disposed within rack cabinet 13. Geography bus and ICMB connector 113 is also connected to each of a pair of element controllers (which will be described further in detail below) which are disposed within compute element 69.

Figure 9:
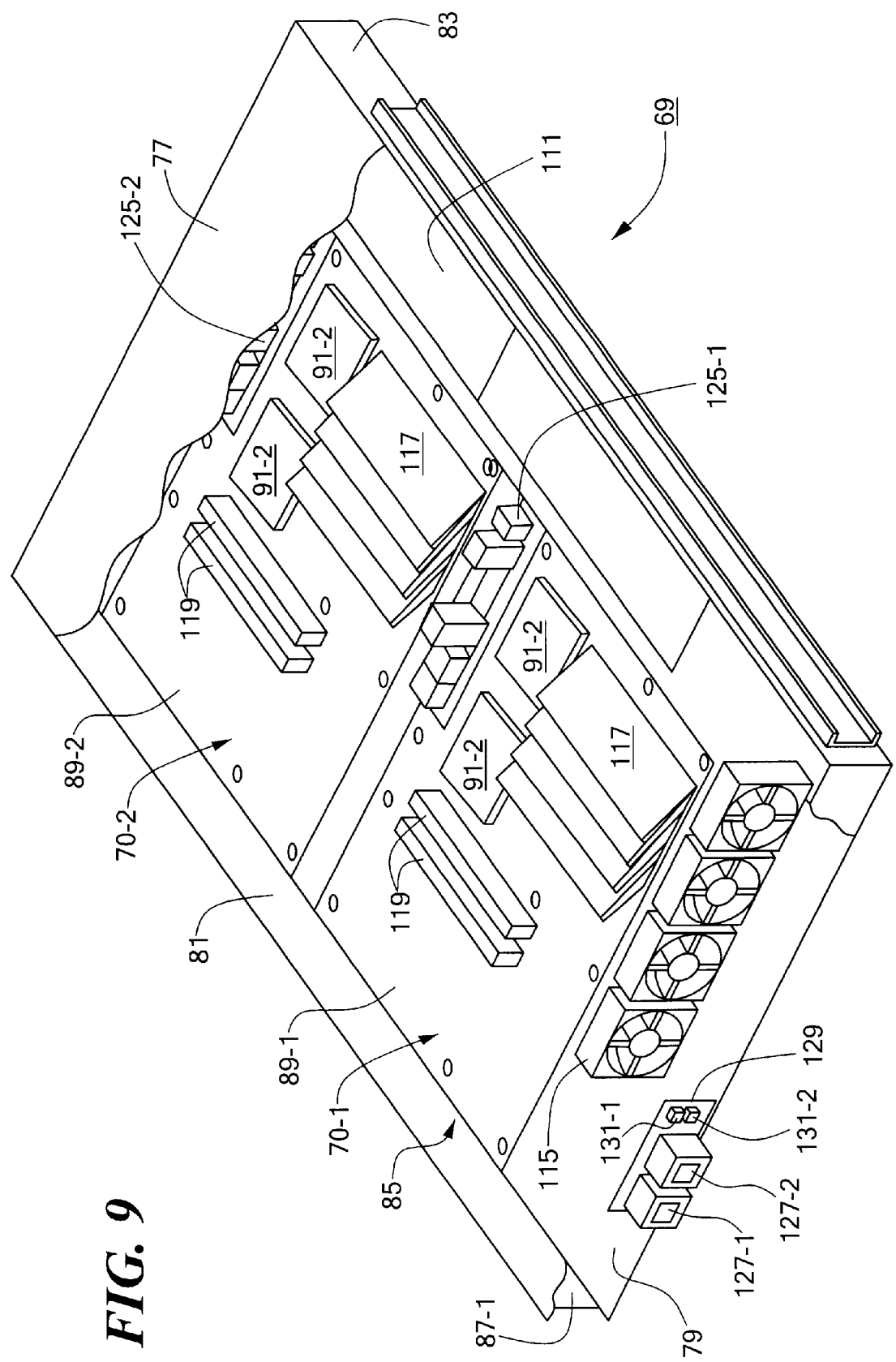
FIG. 9 is a front perspective view, broken away in part, of one of the 1-U compute elements shown, in FIG. 1.

Referring now to FIG. 9, fan assemblies 115 are disposed in interior cavity 85 of chassis 71 on bottom panel 79 in close proximity to front control panel 73. For example, four fan assemblies 115 may be disposed in a one-by-four, side-by-side configuration, fan assemblies 115 representing conventional cooling fans or blowers. In use, fan assemblies 115 serve to draw cool air into interior cavity 85 through ventilation openings formed in front control panel 73 in order to cool various electrical components contained within compute element 69. It should be noted that each motherboard 89 is particularly designed to limit the number of wrong direction air baffles mounted thereon. It should also be noted that both sub-servers 70 of compute element 69 share fan assemblies 115, thereby reducing the overall cost to manufacture and noise produced by compute element 69, which is highly desirable.

Four dual in-line memory module (DIMM) slots 117 and two fibre channel, peripheral component interconnect (PCI) slots 119 are mounted on each motherboard 89. The intended use of PCI slots 119 is for add-in fibre channel controllers. Specifically, add-in fibre channel controllers are connected into a 90 degree conversion board (not shown) which, in turn, is connected into one of PCI slots 119.

A first integrated video connector 121-1 and a first pair of universal serial bus (USB) connectors 123-1 are preferably mounted on front control panel 73 of chassis 71 in electrical connection with first motherboard 89-1 for one sub-server 70. Similarly, a second integrated video connector 121-2 and a second pair of universal serial bus (USB) connectors 123-2 are preferably mounted on front control panel 73 of chassis 71 in electrical connection with second motherboard 89-2 for the other sub-server 70. As can be appreciated, video and USB connectors 121 and 123, respectively, are preferably hot-plugged and are intended for emergency management use and possibly for the initial installation of some operating systems for compute element 69, with video connectors 121 being used to connect a monitor thereto and USB connectors 123 being used to connect a keyboard and mouse thereto. Supported USB devices include a keyboard, a mouse, a CD-ROM, a modem, a communications (COM) port (for operating system debug), and a diskette drive.

A first element controller 125-1 is mounted on first motherboard 89-1, first element controller 125-1 also being connected to first motherboard 89-1, and a second element controller 125-2 is mounted on second motherboard 89-2, second element controller 125-2 also being connected to second motherboard 89-2. Each individual element controller 125 is connected to power conversion board 111 to provide independent power to its associated sub-server 70. First and second element controllers 125 are easily user programmable and primarily function to control the power state of its associated motherboard 89, to control the backlight and display of its associated power button (to be described further in detail below), to monitor the voltage or power within compute element 69, to monitor the operation and temperature of microprocessors 91 of its associated motherboard 89, to control the operation of fans assemblies 115 and to monitor the temperature at the inlet of fans assemblies 115. As can be appreciated, element controller 125 provides a common interface with cabinet controller 67 (which will be described further in detail below) and the rack manager 43.

First and second power buttons 127-1 and 127-2 are disposed in front control panel 73 of chassis 71, power buttons 127 being mounted on a front panel circuit board 129 which is disposed in interior cavity 85 of chassis 71 against control front panel 73, front panel circuit board 129, in turn, being connected to first and second element controllers 125-1 and 125-2. First and second non-maskable interrupt (NMI) switches 131-1 and 131-2 are also mounted onto front panel circuit board 129. NMI switches 131 preferably include tactile response and are disposed entirely within interior cavity 85 of chassis 71, each NMI switch 131 being accessible for activation, by a service technician, through an associated, small NMI switch opening 132 which is formed in front panel 73 of chassis 71. As can be appreciated, first power button 127-1 and first NMI switch 131-1 function in conjunction with first element controller 125-1 which, in turn, is connected to first motherboard 89-1 and second power button 127-2 and second NMI switch 131-2 function in conjunction with second element controller 125-2 which, in turn, is connected to second motherboard 89-2, thereby essentially creating two, independent, front panel, user interface control panels, each power button 127 independently regulating an associated sub-server 70 within the single 1-U chassis 71. First and second NMI switches 131-1 and 131-2 provide first and second motherboards 89-1 and 89-2, respectively, of compute element 69 with the ability to create a dump files for-operating system debugging after a system hang or failure.

Each of first and second power buttons 127 is a momentary push-button switch which comprises a variable color and frequency backlight and a variable text and/or graphics display, the backlight and text/graphics display operating independently of one another. Each of the first and second power buttons 127 may be, but is not limited to a LC 24.4 TREND push-button switch manufactured by PREH ELECTRONICS, INC of Lake Zurich, Ill.

In use, each power button 127 serves as both the power button and the reset button for its associated motherboard 89 and element controller 125. In addition, each power button 127 serves as an indicator for displaying the operational and/or power state of its associated motherboard 89 and element controller 125, each power button, 127 functioning as an indicator which is user intuitive and which complies with industry promulgated, advanced configuration and power interface (ACPI) guidelines.

Specifically, each power button 127 is freely programmable so as to enable the backlight to provide backlighting of varying colors (i.e., green, red and/or orange colored light) at varying frequencies (i.e., solid light, 1 Hz blinking light, etc.). Although the backlight can be used to illuminate the liquid crystal display (LCD) when the ambient lighting is insufficient to enable the display to be read, the primary function of the backlight in this application is to provide means for indicating the particular and power and operational state of its associated sub-server 70 in a manner required by industry promulgated, advanced configuration and power interface (ACPI) specification guidelines. In addition, each power button 127 is freely programmable so as to enable the display to provide various text and graphics indicators, thereby providing the user with a highly intuitive means for identifying the operational and/or power state of its associated sub-server 70 and for instructing the user of what steps must be taken in particular circumstances (i.e., fault conditions).

Another type of compute element 29 which is adapted to be disposed within and interconnected to rack cabinet 13 is a 2-U compute element 133. As will be described further in detail below, the particular construction of 2-U compute element 133 provides numerous advantages.

Specifically, as a first advantage, 2-U compute element 133 does not include any internal devices, such as hard drives, power supplies, or CD-ROMs. As a result, fib compute element 133 has an increased processor density and a lighter overall weight, thereby improving performance and handling. It should be noted that hard drives are not required 2-U compute element 133 fiber boots from a direct connect, or SAN connected, RAID storage device 53 (which will be described further in detail below). The CD-ROM, DVD and/or diskette drives are provided remotely through centrally located rack manager 43 (which will be described further in detail below).

As a second advantage, 2-U compute element 133 operates as a single server which, due to its increased density, thermal capability and power capability, is capable of comprising four, higher power microprocessors (rather than one or two as in typical prior art servers) within a single 2-U chassis, which is highly desirable.

Figure 12:
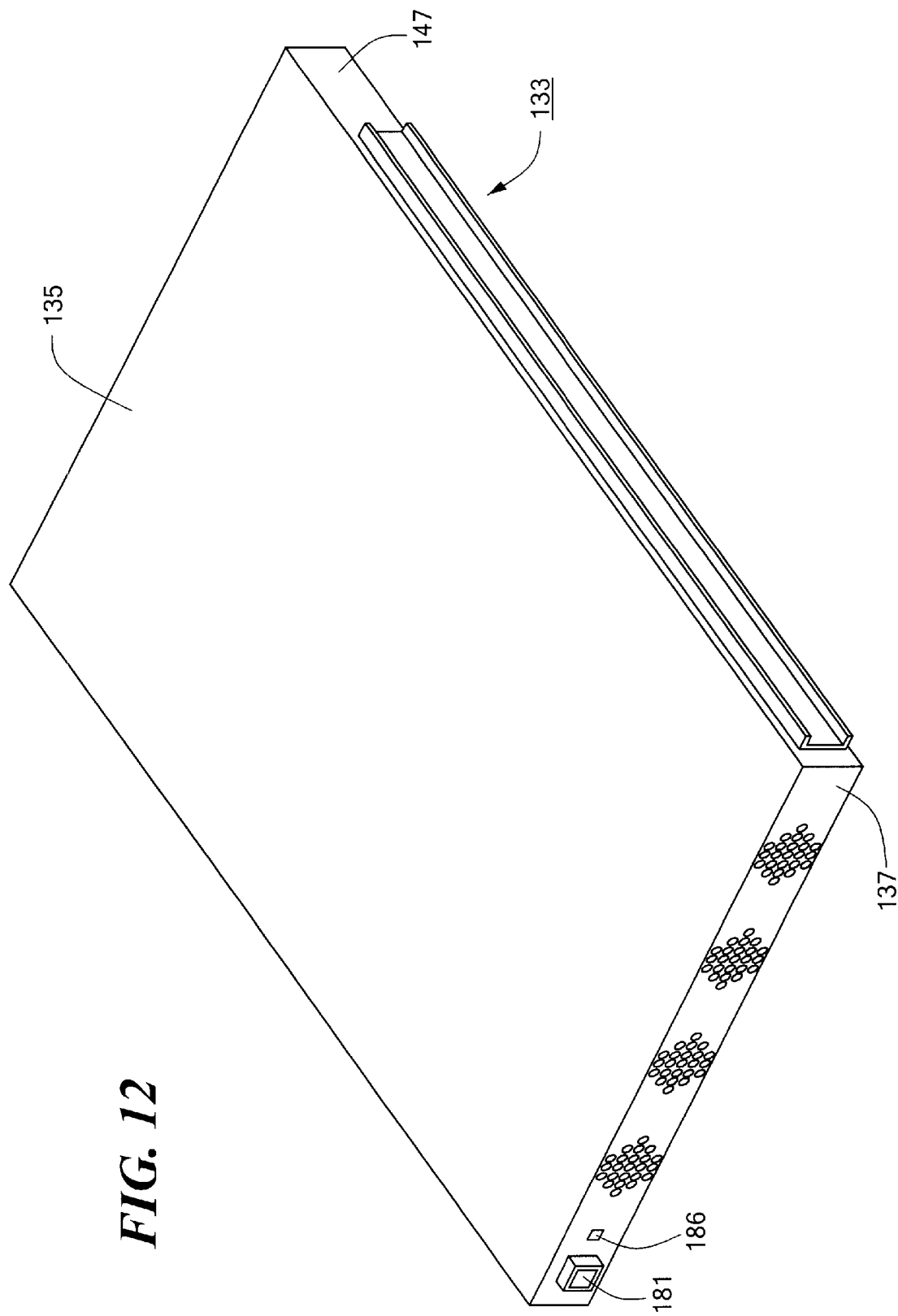
FIG. 12 is a front perspective view of the 2-U compute element shown in FIG. 1.
Figure 13:
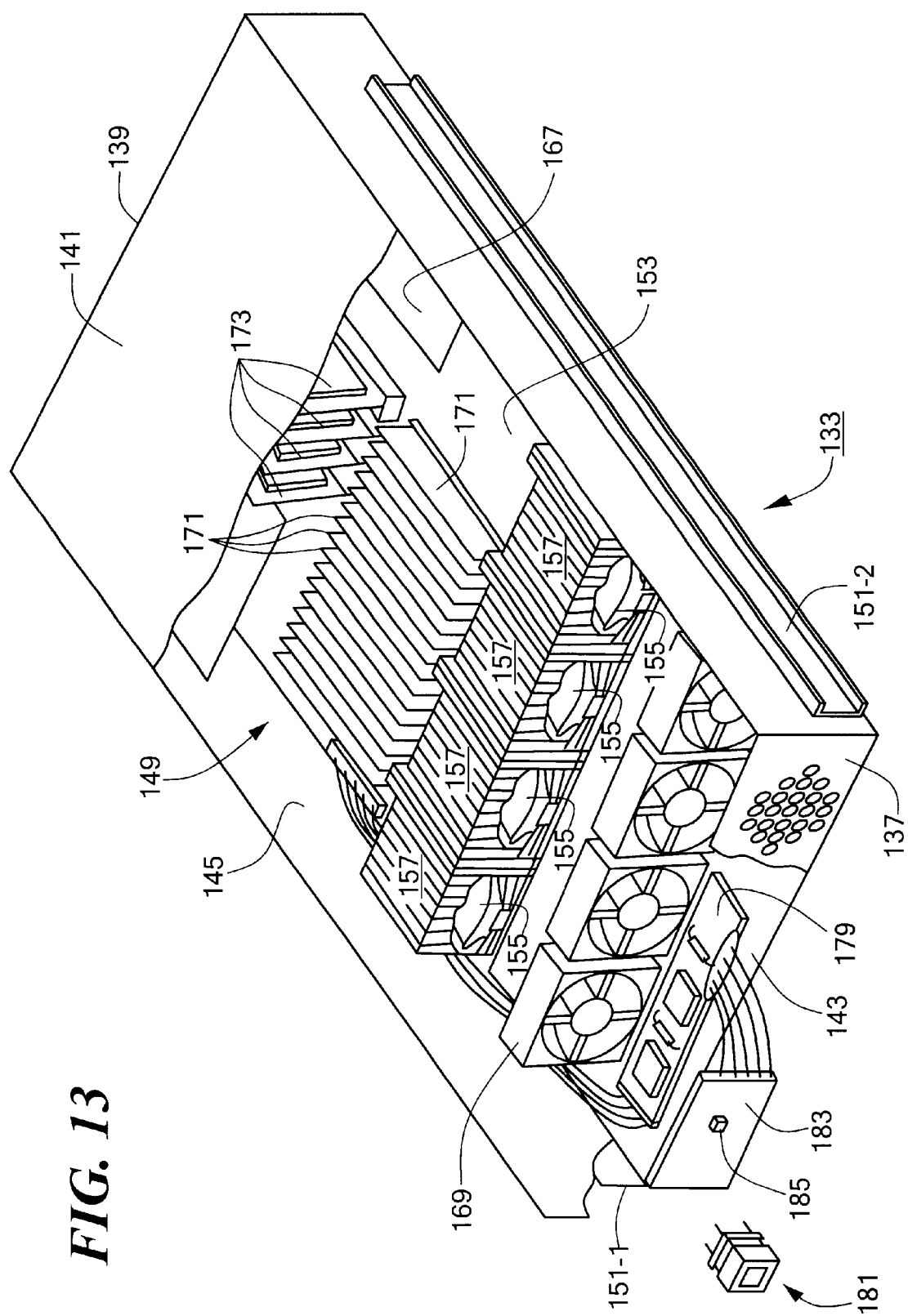
FIG. 13 is a front perspective view, broken away in part, of the 2-U compute element shown in FIG. 1.

Referring now to FIGS. 12–13, 2-U compute element 133, which is adapted to be hot-snapped into rack cabinet 13, comprises a generally rectangular 2-U chassis, or housing, 135 having a front panel 137, a rear panel 139, a top panel 141, a bottom panel 143, a left side panel 145 and a right side panel 147 which together define an interior cavity 149 therebetween, front panel 137 serving as the user interface control panel for compute element 133.

A pair of brackets 151 are fixedly mounted onto chassis 135 to enable 2-U compute element 133 to be slidably disposed within rack cabinet 13. Specifically, a first bracket 151-1 is fixedly mounted onto left side panel 145 and a second bracket 151-2 is fixedly mounted on right side panel 147. Pair of brackets 151 are sized and shaped to slidably engage within an associated pair of brackets 31 which are mounted on frame 15 of rack cabinet 13. It should be noted that, since brackets 31 are mounted on frame 15 within compute element portion 27 of cabinet interior 25 in 1-U boundaries, 2-U compute element 133 can be slidably disposed within any unused, 2-U portion of compute element portion 27 of rack cabinet 13, according to the needs of the user. It should also be noted that neither brackets 31 nor brackets 151 are equipped with ball bearings due to the light, highly serviceable nature of compute element 133, which is highly desirable.

A main printed circuit board, or motherboard, 153 is disposed within interior cavity 149 of chassis 135 on bottom panel 143. Four microprocessors 155 are mounted onto main printed circuit board 153 and are responsible for the main computing functions of compute element 133. An associated multi-finned heatsink 157 is mounted on each microprocessor 155, each heatsink 157 serving to facilitate the cooling of its associated microprocessor 155. For example, each processor 155 may be a 1.4 Ghz FOSTER processor of the type manufactured by INTEL CORPORATION. However, it is to be understood that alternative processors could be used in place thereof, such as PENTIUM processors of the type manufactured by INTEL CORPORATION, without departing from the spirit of the present invention. As noted above, the implementation of four, high speed processors within single 2-U chassis 135 provides more processor density than conventional, similar sized servers, which is highly advantageous.

First and second infrastructure connector assemblies 159-1 and 159-2 are permanently mounted on rear panel 139 of chassis 135. As can be appreciated, as compute element 133 is slidably disposed within compute element portion 27 of rack cabinet 13, the pair of infrastructure connector assemblies 159 are adapted to snap-interconnect with a corresponding pair of infrastructure connector assemblies 33 mounted on the rear portion of frame 15 of rack cabinet 13, thereby electrically and mechanically coupling compute element 133 with rack cabinet 13.

It should be noted that, because infrastructure connector assemblies 33 are permanently mounted on frame 15 in 1-U boundaries, each compute element 29 is adapted to interconnect to a proportional number of associated connector assemblies 33. For example, 1-U compute element 69 is adapted to interconnect to one infrastructure connector assembly 33. In addition, 2-U compute element 133 is adapted to interconnect with two infrastructure connector assemblies 33. Furthermore, 3-U, 4-U, 6-U and 8-U compute elements (not shown) are adapted to interconnect with three, four, six and eight infrastructure connector assemblies 33, respectively. As can be appreciated, due to the fact that each compute element 29 is adapted to receive a proportional number of infrastructure connector assemblies 33, each compute element 29, regardless of its size, is capable of fulfilling its power and I/O requirements, which is highly desirable. Specifically, smaller compute elements 29 have lower power and I/O requirements and therefore require fewer infrastructure connector assemblies 33, whereas larger compute elements 29 have larger power and I/O requirements and therefore require more infrastructure connector assemblies 33.

First infrastructure connector assembly 159-1 comprises a signal snap interface connector 161-1 and a power snap interface connector 163-1. Similarly, second infrastructure connector assembly 159-2 comprises a signal snap interface connector 161-2 and a power snap interface connector 163-2.

Each signal snap interface connector 161 is identical with signal snap interface connector 97 and, accordingly, includes a male, vertical header 99 which is adapted to snap-interconnect within the signal snap interface connector 35 of the corresponding infrastructure connector assembly 33 in rack cabinet 13.

In addition, each signal snap interface connector 161 includes a pair of 10/100 ethernet, unshielded, local area network (LAN) cables 101 which are preferably PXE 2.1 compliant. The LAN cables 101 for first signal snap interface connector 161-1 are connected to motherboard 153 and the LAN cables 101 for second signal snap interface connector 161-2 are connected to a mezzanine card 165 disposed approximately 1.75 inches above in electrical connection with motherboard 153. Each LAN cable.101 includes an associated LAN connector 103 which is disposed into vertical header 99, one LAN connector 103-1 for each signal snap interface connector 161 being connected to LAN connector 39-1 and the other LAN connector 103-2 being connected to LAN connector 39-2.

Furthermore, each signal snap interface connector 161 includes a pair of shielded fibre cables 105. The fibre channel cables 105 for first signal snap interface connector 161-1 are connected to motherboard 153 and the fibre channel cables 105 for second signal snap interface connector 161-2 are connected to mezzanine card 165. Each fibre cable 105 includes an associated fibre channel connector 107 which is disposed into vertical header 99, each fibre channel connector 105 being connected to an associated fibre channel connector 49.

Each power snap interface connector, or direct current interface assembly (DCIAs), 163 is identical with power snap interface connector 98. As can be appreciated, as compute element 133 is slidably disposed within compute element portion 27 of rack cabinet 13, each power snap interface connector 163 is adapted to snap-interconnect with a corresponding power snap interface connector 37 in rack cabinet 13.

Each power snap interface connector 163 is connected to a power connector 109 which, in turn, is connected to power connector 55 of an associated infrastructure connector assembly 33 on rack cabinet 13 when compute element 133 is disposed within rack cabinet 13. Together, power connectors 109 serve to provide 48 Volts of DC power to 2-U compute element 133 and 12 Volts of standby power, one power connector 109 serving to bring 48 volts to the voltage regulator modules (VRM) of the quad FOSTER processors 155 and the other power connector 109 serving to generate the standard voltages on DCIAs 163 for the element controllers (which will be described further in detail below). Power connectors 109 are connected to a single power domain DC to DC conversion board 167 which is disposed in interior cavity 149 of chassis 135 on bottom panel 143.

In addition, each power snap interface connector 163 is connected to a combination geography bus and intelligent chassis management bus (ICMB) connector 113 which, in turn, is connected to the geography bus and ICMB connector of its corresponding infrastructure connector assembly 33 on rack cabinet 13 when compute element 133 is disposed in rack cabinet 13. Each geography bus/ICMB connector 113 is also connected to the element controller (which will be described further in detail below) disposed within 2-U compute element 133.

Fan assemblies 169 are disposed in interior cavity 149 of chassis 135 on bottom panel 143 in close proximity to front control panel 137. For example, four fan assemblies 169 may be disposed in a one-by-four, side-by-side configuration, fan assemblies 169 representing conventional cooling fans or blowers. In use, fan assemblies 169 serve to draw cool air into interior cavity 149 through ventilation openings formed in front control panel 137 in order to cool various electrical components contained within cavity 149 of compute element 133.

Sixteen dual in-line memory module (DIMM) slots 171 and four, 66 MHz peripheral component interconnect (PCI) slots 173 are mounted on motherboard 153. The intended use of PCI slots 173 is for add-in optical interface PCI controllers.

An integrated video connector 175 and two universal serial bus (USB) connectors 177 are preferably mounted on front control panel 137 of chassis 135, in electrical connection with motherboard 153. As can be appreciated, video and USB connectors 175 and 177, respectively, are preferably hot-plugged and are intended for emergency management use and possibly for the initial installation of some operating systems for compute element 133, with video connector 175 being used to connect a monitor thereto and USB connectors 177 being used to connect supported USB devices thereto, such as a keyboard, a mouse, a CD-ROM, a modem, a communications (COM) port (for operating system debug), and a diskette drive.

An element controller 179 is disposed within interior cavity 149 of chassis 135 between motherboard 153 and front panel 137, element controller 179 being connected to motherboard 153. Element controller 179 is connected to power conversion board 167 to provide power to compute element 133. Element controller 179 is easily user programmable and primarily functions to control the power state of compute element 133, to control the backlight and display of the power button (to be described further in detail below), to monitor the voltage or power within compute element 133, to monitor the operation and temperature of microprocessors 155, to control the operation of fan assemblies 169 and to monitor the temperature at the inlet of fan assemblies 169. As can be appreciated, element controller 179 provides a common interface with cabinet controller 67 (which will be described further in detail below) and rack manager 43.

A power button 181 is disposed in front control panel 137 of chassis 135. Power button 181 is mounted on a front panel circuit board 183 which is disposed in interior cavity 149 of chassis 135 against control panel 137. A non-maskable interrupt (NMI) switch 185 is also mounted onto front panel circuit board 183. NMI switch 185 preferably includes tactile response and is disposed entirely within interior cavity 149 of chassis 135, NMI switch 185 being accessible for activation, by a service technician, through a small NMI switch opening 186 which is formed in front panel 137 of chassis 135. As can be appreciated, NMI switch 185 provides compute element 133 with the ability to create a dump file for operating system debugging after a system hang or failure. Front panel circuit board 183, in turn, is connected to element controller 179. Power button 181 is a momentary push-button switch which comprises a variable color and frequency backlight and a variable text and/or graphics display, the backlight and text/graphics display operating independently of one another. Power button 181 may be, but is not limited to a LC 24.4 TREND push-button switch manufactured by PREH ELECTRONICS, INC of Lake Zurich, Ill. In use, power button 181 serves as both the power button and the reset button for compute element 133. In addition, power button 181 serves as an indicator for displaying the operational and/or power state of compute element 133, power button 181 functioning as an indicator which is user intuitive and which complies with industry promulgated, advanced configuration and power interface (ACPI) guidelines. Specifically, power button 181 is freely programmable so as to enable the backlight to provide backlighting of varying colors (i.e., green, red and/or orange colored light) at varying frequencies (i.e., solid light, 1 Hz blinking light, etc.). Although the backlight can be used to illuminate the liquid crystal display (LCD) when the ambient lighting is insufficient to enable the display to be read, the primary function of the backlight in this application is to provide means for indicating the particular and power and operational state of compute element 133 in a manner required by industry promulgated, advanced configuration and power interface (ACPI) specification guidelines. In addition, power button 181 is freely programmable so as to enable the display to provide various text and graphics indicators, thereby providing the user with a highly intuitive means for identifying the operational and/or power state of compute element 133 and for instructing the user of what steps must be taken in particular circumstances (i.e., fault conditions).

Referring now to FIGS. 2, 4, 5 and 7, distributed power bay (DPB) 59 centrally powers computer system 11. Preferably, DPB 59 is a 3-U distributed power bay (DPB) which includes as many as six hot-swappable distributed power supplies (DPS) 187, each power supply 187 providing power in the range from 800 to 1600 Watts. However, it is to be understood that alternative types of power sources could be used in place of DPB 59 without departing from the spirit of the present invention.

Distributed power bay 59 is connected to each 1-U power connector 55 mounted on rack cabinet 13 through a 48 Volt power cord 61, thereby enabling distributed power bay 59 to be a 48 volt distributed power system. Specifically, the rear of distributed power bay 59 comprises eight current controlled power output ports, or external connections, which can not be load shared. Each of the external connections of DPB 59 is connected to 48 volt power cord 61which, in turn, splits into a pair of eight prong, power plugs 57, each power plug 57 connecting to an associated power connector 55. As such, each of the external connections on the rear of distributed power bay 59 drives 2-U of compute elements 29 in RAIC 11.

As noted briefly above, power supplies 187 in DPB 59 are preferably hot-swappable and are connected in an N+1 configuration to enable a single power supply 187 to be removed from DPB 59 without shutting compute elements 29 down. DPB 59 is constructed such that, power supplies 187 are added thereto based upon the number of compute elements 29 in system 11. As such, when limited power is needed for compute system 11, less than six power supplies 187 may be installed in DPB 59 without affecting performance. Specifically, entry level configurations only require two power supplies 187 arranged in an N+1 configuration.

As a result, a fully loaded DPB 59 which includes six power supplies 187 can power up to 16-U of compute elements 29 (i.e., eight 2-U compute elements 133, 16 1-U compute elements 69, or a mix of 1-U compute elements 69 and 2-U compute elements 133 which total 16-U). Together, the 3-U DPB 59 plus the 16-U of compute elements 29 is exactly ½ of the 38-U, model 15000, rack cabinet 13.

Consequently, a fully loaded 38-U rack cabinet 13 would require two fully loaded DPBs 59, which together have a height of 6-U, to centrally power 32-U of compute elements 29. It should be noted that 32-U of compute elements 29 in one rack cabinet 13 can include as many as sixty-four FOSTER processors 155 (if sixteen 2-U compute elements 133 are utilized) or one hundred twenty-eight CuMi processors 91 (if thirty-two 1-U compute elements 69 are utilized), thereby providing computer system 11 with high application performance.

As can be appreciated, it should also be noted that the centralization of one or more DPBs 59 to power computer system 11 eliminates the need for each compute element 29 to include a power supply therein. Accordingly, the centralization of power for compute elements 29 provides numerous advantages, As a first advantage, the centralization of power for compute elements 29 increases the amount of free space in each individual compute element 29. As a result, more space within each compute element 29 can be directed to processors and associated circuitry, thereby increasing server density and improving performance of computer system 11.

As a second advantage, the centralization of power for compute elements 29 drastically reduces the weight of each compute element 29 in computer system 11, thereby enabling compute elements 29 to be handled and serviced by a single person.

As a third advantage, the centralization of power for compute elements 29 eliminates redundant, unnecessary power supplies, thereby providing significant cost savings in manufacturing computer system 11.

As shown in FIGS. 3, 6 and 7, rack manager 43 is shown being permanently disposed into rack cabinet 13. As can be appreciated, rack manager 43 is the highest level manager for computer system 11.

Preferably, rack manager 43 is based off models 1400 or 1500 of the AVI ION rack system constructed by EMC Corporation of Hopkinton, Massachusetts and is capable of being collapsed and disposed within rack cabinet 13 when not in use. Rack manager 43 centrally provides video devices 44 and I/O devices 46 for computer system 11. Specifically, rack manager 43 preferably comprises at least some of the following internal I/O devices 46 for computer system 11: a 3.5 inch central diskette drive, a single DVD or CD-ROM drive, a keyboard, a mouse, a monitor and a modem. However, it is to be understood that alternative types of rack managers which include different internal devices could be used in place of rack manager 43 without departing from the spirit of the present invention.

It should be noted that rack manager 43 need not be included in each computer system 11 and accordingly could be removed therefrom without departing from the spirit of the present invention. In particular, rack manager 43 need only be provided for one out of four linked rack cabinets 13. Specifically, rack manager 43 comprises SAN fibre channel connection and a LAN controller for communication to a maximum of four cabinet controllers 67, thereby enabling SAN boot or network boot of all additional computer systems 11. As such, the rack manager serves as the user interface for managing up to four separate computer systems 11.

It should be noted that centrally locating particular internal devices within rack manager 43, rather than in each of the individual compute elements 29, creates numerous advantages.

As a first advantage, centrally locating particular user-interface internal devices within rack manager 43 increases the amount of free space in individual compute elements 29. As a result, more space within compute elements 29 can be directed to processors and associated circuitry, thereby increasing server density and improving performance of computer system 11.

As a second advantage, centrally locating particular user-interface internal devices within rack manager 43 eliminates the need to redundantly supply such devices within each individual compute elements 29, thereby providing significant cost savings in manufacturing computer system 11.

As a third advantage, centrally locating particular user-interface internal devices within rack manager 43 significantly reduces the weight of each compute element 29 in computer system 11, thereby enabling individual compute elements 29 to be easily handled and serviced by a single person.

As a fourth advantage, centrally locating particular user-interface internal devices within rack manager 43 serves to create a single user-interface for managing a plurality of different compute elements 29.

Referring now to FIGS. 5 and 7, cabinet controller 67, which is permanently disposed in the rear of rack cabinet 13 behind distributed power bay 59, controls most of the server management functions for computer system 11. Specifically, cabinet controller 67 is responsible for the management of geography bus 189 and intelligent chassis management bus (ICMB), or system management bus, 191 for computer system 11, as will be described further in detail below.

Cabinet controller 67 is connected to rack manager 43 via a 10/100 ethernet LAN cable 193. As such, cabinet controller 67 converts LAN packets from rack manager 43 into ICMB and geography packets which, in turn, are sent to individual compute elements 29. In this manner, cabinet controller 67 acts as the server management interface, or bridge, between rack manager 43 and the various compute elements 29.

Cabinet controller 67 is coupled, via ribbon cable 65, to each combination geography bus and ICMB connector 63 which is fixedly mounted onto rack cabinet 13. As such, with compute elements 29 snap-disposed within rack cabinet 13, cabinet controller 67 is connected to the element controller of each compute element 29 disposed therein, cabinet controller 67 being capable of connecting to 32-U of compute elements 29. Cabinet controller 67 is also coupled to distributed power bay 59 of computer system 11 via ribbon cable 65. As can be appreciated, geography bus 189 and intelligent chassis management bus (ICMB) 191 are both connected to cabinet controller 67, to the element controller of each compute element 29 and to distributed power bay 59 through ribbon cable 65.

Geography bus 189 assigns geographic identifiers for each compute element 29 in computer system 11, thereby enabling server management software to determine the physical location of each device within the RAIC 11 and to identify the location of a failed compute element 29.

ICMB 191 enables server management software to control the various compute elements 29 and Distributed Power Bays (DPBs) 59 disposed within computer system 11. In particular, ICMB 191 enables power and reset control for each compute element 29, limited COM port redirection and power and cooling failure notification.

Referring now to FIGS. 3 and 6, fibre channel connectors 49 of rack cabinet 13 are connected, via a 2 Gbit fibre channel 50, to a fibre channel switch 51, such as of the type manufactured by BROCADE Corporation. Fibre channel switch 51, in turn, is connected to centrally located, main storage device 53 for computer system 11. Storage device 53 may be, for example, any of the full fibre CLARiiON ALPINE systems or SYMETRIX Fibre Channel Storage Systems manufactured by EMC Corporation of Hopkinton, Mass. Main storage device 53 may be in the form of a rack of external hard drives, commonly referred to as a redundant array of independent disks (RAID) in the art. It should be noted that each disk drive in the RAID can be assigned to an individual compute element 29, which is highly advantageous, compute elements 29 receiving an NT boot from storage device 53.

The embodiment shown in the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A computer system comprising:
   (a) a rack cabinet having a cabinet interior,
   (b) at least one compute element adapted to be disposed within the cabinet interior of said rack cabinet, said at least one compute element comprising two independently functioning servers which are housed within a common chassis,
   (c) at least one distributed power bay adapted to be disposed within the cabinet interior of said rack cabinet for providing central power for said computer system, and
   (d) a rack manager mounted onto said rack cabinet, said rack manager being in connection with said at least one compute element, said rack manager comprising the central video and I/O devices for said computer system.

2. The computer system of claim 1 further comprising a cabinet controller mounted onto said rack cabinet, said cabinet controller controlling server management functions for said computer system.

3. The computer system of claim 2 wherein said cabinet controller is connected to said rack manager and to said at least one computer element and is responsible for the management of a geography bus and an intelligent chassis management bus for said computer system.

4. The computer system of claim 3 further comprising a fibre channel switch mounted onto said rack cabinet, said fibre channel switch being connected to said at least one compute element.

5. The computer system of claim 1 wherein the common chassis of said at least one compute element is externally wireless.

6. The computer system of claim 1 wherein the common chassis is 1-U in height.

7. The computer system of claim 6 wherein each server comprises a motherboard, a power button connected to the motherboard and an element controller connected to the motherboard, the element controller serving to control the power state of the motherboard.

8. The computer system of claim 7 wherein a pair of microprocessors are mounted on the motherboard for each server.

9. A computer system comprising:
   (a) a rack cabinet having a cabinet interior, and
   (b) at least one compute element adapted to be disposed within the cabinet interior of said rack cabinet, said at least one compute element comprising two independently functioning servers which are housed within a common chassis.

10. The computer system of claim 9 wherein said common chassis is 1-U in height.

11. The computer system of claim 9 wherein each server comprises a motherboard.

12. The computer system of claim 11 wherein each server further comprises a pair of microprocessors connected to its associated motherboard.

13. The computer system of claim 11 wherein each server further comprises a power button connected to its associated motherboard and an element controller connected to its associated motherboard, the element controller serving to control the power state of its associated motherboard.

* * * * *